(12) United States Patent
Sakai et al.

(10) Patent No.: US 11,543,833 B2
(45) Date of Patent: Jan. 3, 2023

(54) VEHICLE CONTROL DEVICE, VEHICLE CONTROL METHOD, AND VEHICLE CONTROL SYSTEM

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/711,910

(22) Filed: Dec. 12, 2019

(65) Prior Publication Data

US 2020/0209888 A1 Jul. 2, 2020

(30) Foreign Application Priority Data

Dec. 26, 2018 (JP) .............................. JP2018-243548

(51) Int. Cl.
*G05D 1/02* (2020.01)

(52) U.S. Cl.
CPC .......... *G05D 1/0276* (2013.01); *G05D 1/0212* (2013.01)

(58) Field of Classification Search
CPC ............... G06F 3/04815; G06F 3/0482; G06F 3/04847; G06T 19/006; G05D 1/0276; G05D 1/0212; G05D 2201/0213; G05D 1/0022; G08G 1/096725; G08G 1/096822; H04W 4/02; H04W 4/40; H04W 4/44; G06Q 50/30; B60W 50/00; B60W 2050/0002

See application file for complete search history.

(56) References Cited

U.S. PATENT DOCUMENTS 8,965,579 B2 *  2/2015  Wang .................... B25J 9/1664
                                                    700/259
9,547,307 B1    1/2017  Cullinane et al.
(Continued)

FOREIGN PATENT DOCUMENTS

JP  2008-110620 A   5/2008
WO  2017/111126 A1  6/2017

*Primary Examiner* — Rodney A Butler

(74) *Attorney, Agent, or Firm* — Dinsmore & Shohl LLP

(57) ABSTRACT

A vehicle control device includes a communication unit configured to be communicable with an autonomous driving vehicle that autonomously travels, a determination unit configured to determine whether there is a possibility that communication between the autonomous driving vehicle and the vehicle control device is disconnected, based on information indicating a communication status between the autonomous driving vehicle and the vehicle control device, and a travel instruction unit configured to transmit, when there is the possibility that the communication between the autonomous driving vehicle and the vehicle control device is disconnected, a travel instruction to the autonomous driving vehicle via the communication unit before the communication between the autonomous driving vehicle and the vehicle control device is disconnected. The travel instruction matches conditions associated with travel control of the autonomous driving vehicle.

3 Claims, 6 Drawing Sheets

(56) References Cited

U.S. PATENT DOCUMENTS

| | | | |
|---|---|---|---|
| 2014/0142787 A1* | 5/2014 | Tillotson | H04K 3/224 |
| | | | 701/3 |
| 2017/0334069 A1* | 11/2017 | Wang | B25J 11/009 |
| 2018/0299285 A1* | 10/2018 | Morita | G08G 1/096811 |
| 2019/0107411 A1* | 4/2019 | Gil | G06Q 10/047 |
| 2019/0185018 A1* | 6/2019 | Tao | B60W 50/14 |

* cited by examiner

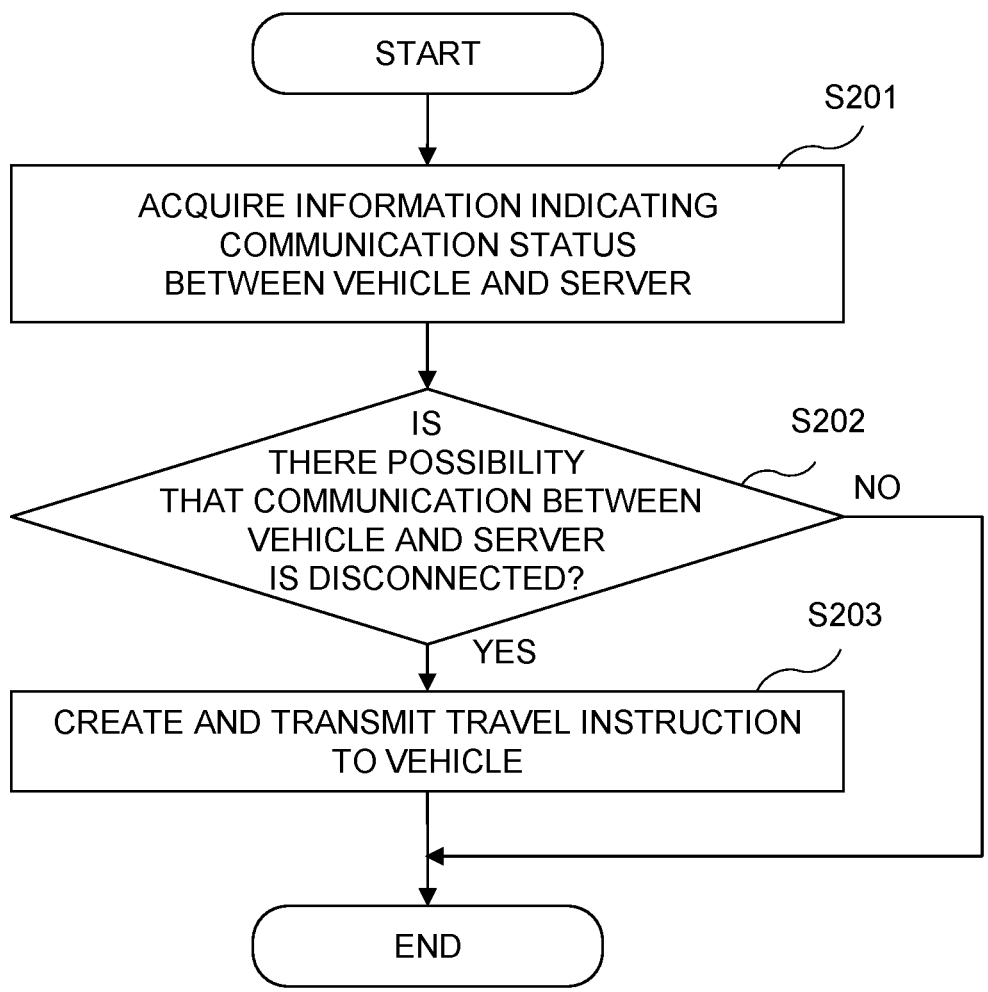

VEHICLE CONTROL DEVICE, VEHICLE CONTROL METHOD, AND VEHICLE CONTROL SYSTEM

CROSS-REFERENCE TO RELATED APPLICATIONS

This application claims priority to Japanese Patent Application No. 2018-243548 filed on Dec. 26, 2018, which is incorporated herein by reference in its entirety including the specification, drawings, and abstract.

BACKGROUND

1. Technical Field

The present disclosure relates to a vehicle control device, a vehicle control method, and a vehicle control system, each of which controls an autonomous driving vehicle.

2. Description of Related Art

A technology for controlling an autonomous driving vehicle capable of autonomous travel, without the need for a driver, by linking the autonomous driving vehicle and a server communicably connected to the autonomous driving vehicle via a communication network, has been studied. For example, a technology is suggested in which an autonomous driving vehicle is directed to a location designated by dispatch information transmitted from a server to the autonomous driving vehicle via a communication network, or the autonomous driving vehicle transmits a current position to the server via the communication network so as to be tracked by the server (see, for example, U.S. Pat. No. 9,547,307).

SUMMARY

However, communication between the autonomous driving vehicle and the server may not be established depending on a communication environment of the autonomous driving vehicle. In such a case, the autonomous driving vehicle cannot receive an instruction from the server, and the travel of the autonomous driving vehicle may be disturbed since the vehicle is not able to determine the next operation.

Therefore, the present disclosure provides a vehicle control device capable of controlling an autonomous driving vehicle even though the autonomous driving vehicle sometimes cannot receive an instruction matching conditions associated with travel control via a communication network.

A first aspect of the present disclosure is a vehicle control device. The vehicle control device includes a communication unit configured to be communicable with an autonomous driving vehicle that autonomously travels, a determination unit configured to determine whether there is a possibility that communication between the autonomous driving vehicle and the vehicle control device is disconnected, based on information indicating a communication status between the autonomous driving vehicle and the vehicle control device, and a travel instruction unit configured to transmit, when there is the possibility that the communication between the autonomous driving vehicle and the vehicle control device is disconnected, a travel instruction to the autonomous driving vehicle via the communication before the communication between the autonomous driving vehicle and the vehicle control device is disconnected. The travel instruction matches conditions associated with travel control of the autonomous driving vehicle.

In such a vehicle control device, the information indicating the communication status may be a current position of the autonomous driving vehicle, the vehicle control device further may include a storage unit configured to store map information indicating a communication disconnection area in which there is the possibility that the communication between autonomous driving vehicle and the vehicle control device is disconnected, and a travel route on which the autonomous driving vehicle is scheduled to travel, and the determination unit may determine, when the travel route is included in the communication disconnection area within a predetermined range from the current position of the vehicle, that there is the possibility that the communication between the autonomous driving vehicle and the vehicle control device is disconnected position of the vehicle.

Alternatively, in such a vehicle control device, the information indicating the communication status may be a signal status value indicating strength or quality of a signal received by the autonomous driving vehicle from a relay device that relays the communication between the autonomous driving vehicle and the vehicle control device, and, the determination unit may determine, when the strength or quality of the signal indicated by the signal status value satisfies a condition that there is the possibility that communication between the autonomous driving vehicle and the vehicle control device is disconnected, that there is the possibility that the communication between the autonomous driving vehicle and the vehicle control device is disconnected.

A second aspect of the present disclosure is a vehicle control system including an autonomous driving vehicle that autonomously travels, and a vehicle control device. In the vehicle control system, the vehicle control device includes: a communication unit configured to be communicable with the autonomous driving vehicle, a determination unit configured to determine whether there is a possibility that communication between the autonomous driving vehicle and the vehicle control device is disconnected or not, based on information indicating a communication status between the autonomous driving vehicle and the vehicle control device, and a travel instruction unit configured to transmit, when there is the possibility that the communication between the autonomous driving vehicle and the vehicle control device is disconnected, a travel instruction to the autonomous driving vehicle via the communication unit before the communication between the autonomous driving vehicle and the vehicle control device is disconnected. The travel instruction matches conditions associated with the travel control of the autonomous driving vehicle. The autonomous driving vehicle includes a travel control unit configured to control the autonomous driving vehicle such that the autonomous driving vehicle travels according to the received travel instruction.

In such a vehicle control system, the travel instruction unit may transmit, when there is the possibility that the communication between the autonomous driving vehicle and the vehicle control device is disconnected, a plurality of the travel instructions to the autonomous driving vehicle via the communication unit before the communication between the autonomous driving vehicle and the vehicle control device is disconnected, the autonomous driving vehicle further may include a user interface unit configured to notify a user who boards the autonomous driving vehicle of the plurality of the received travel instructions, and the travel control unit of the autonomous driving vehicle may control the autonomous driving vehicle such that the autonomous driving vehicle travels according to a travel instruction selected by the user via the user interface unit out of the plurality of the received travel instructions.

Alternatively, in the vehicle control system, the travel instruction unit may set, when there is the possibility that the communication between the autonomous driving vehicle and the vehicle control device is disconnected, a priority for each of the plurality of travel instructions, and may transmit each of the plurality of travel instructions to the autonomous driving vehicle via the communication unit together with the priority set for the travel instruction, before the communication between the autonomous driving vehicle and the vehicle control device is disconnected, and the travel control unit of the autonomous driving vehicle may select the travel instructions that are applicable depending on a situation around the autonomous driving vehicle out of the plurality of the received travel instructions, and control the autonomous driving vehicle such that the autonomous driving vehicle travels in according to a travel instruction with the highest priority out of the selected travel instructions.

A third aspect of the present disclosure is a vehicle control method. The vehicle control method includes a step of controlling an autonomous driving vehicle that autonomously travels, a step of determining, by a vehicle control device, whether there is a possibility that communication between the autonomous driving vehicle and the vehicle control device is disconnected, based on information indicating a communication status between the autonomous driving vehicle and the vehicle control device, and a step of transmitting, by the vehicle control device, when there is the possibility that the communication between the autonomous driving vehicle and the vehicle control device is disconnected, a travel instruction to the autonomous driving vehicle before the communication between the autonomous driving vehicle and the vehicle control device is disconnected. The travel instruction matches conditions associated with travel control of the autonomous driving vehicle.

A fourth aspect of the present disclosure is a vehicle control device. The vehicle control device includes a communication unit configured to be communicable with an autonomous driving vehicle that autonomously travels, a determination unit configured to determine, based on a travel route on which the autonomous driving vehicle is scheduled to travel, a current position of the autonomous driving vehicle, and information indicating a traffic situation on the travel route, whether there is a possibility that the autonomous driving vehicle encounters a predetermined traffic situation, and a travel instruction unit configured to transmit, when there is the possibility that the autonomous driving vehicle encounters the predetermined traffic situation, a travel instruction to the autonomous driving vehicle via the communication unit before the autonomous driving vehicle encounters the predetermined traffic situation. The travel instruction matches conditions associated with travel control of the autonomous driving vehicle.

The present disclosure has advantageous effects of providing a vehicle control device capable of controlling an autonomous driving vehicle even though the autonomous driving vehicle sometimes cannot receive an instruction matching conditions associated with travel control via a communication network.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is an operational flowchart of the vehicle control processing.

DETAILED DESCRIPTION OF EMBODIMENTS

Figure 1:
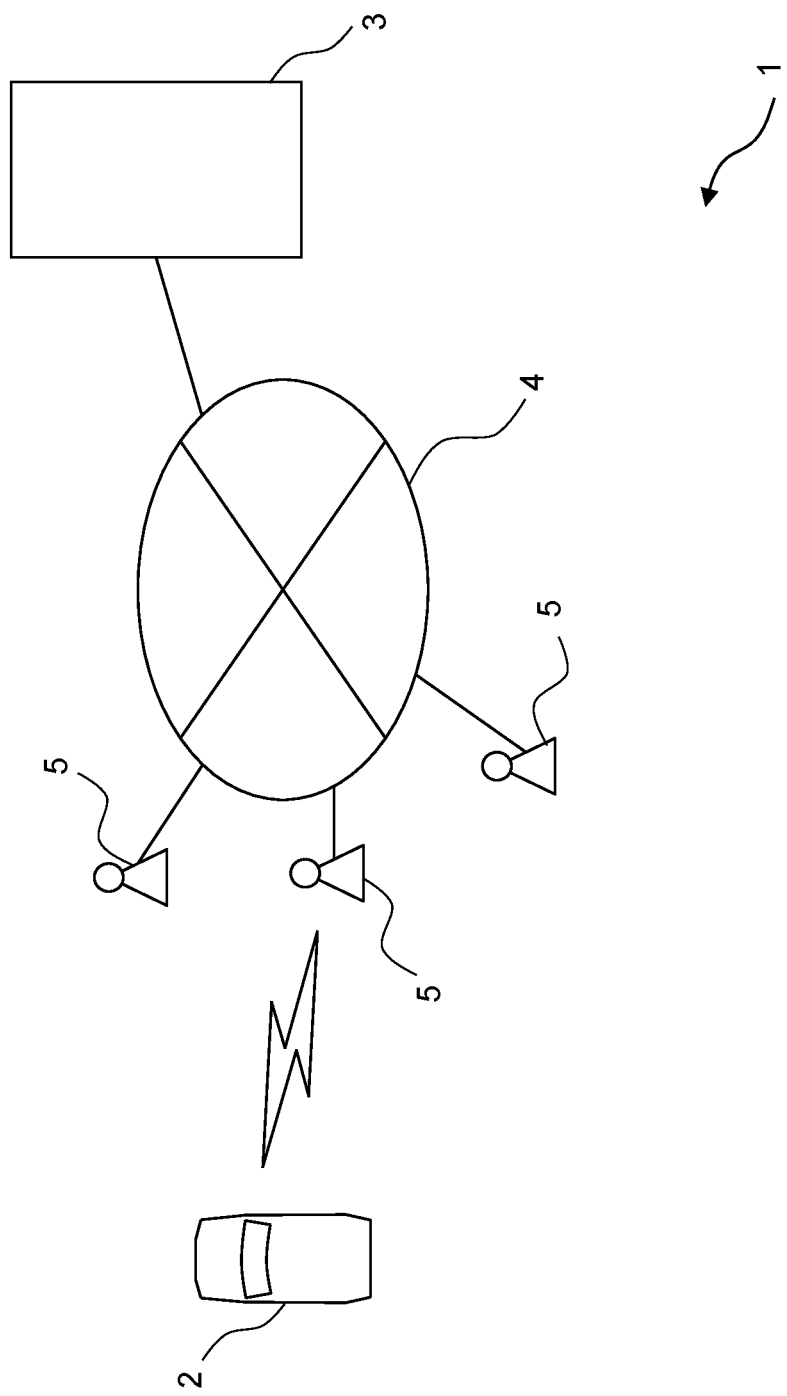
FIG. 1 is a schematic block diagram of a vehicle control system in which a vehicle control device according to one embodiment is implemented.

Hereinafter, a vehicle control device and a vehicle control system including the vehicle control device will be described with reference to the drawings. The vehicle control device is configured to be communicable with an autonomous driving vehicle capable of autonomous travel via a communication network. The vehicle control device transmits an instruction to the autonomous driving vehicle via the communication network, in a case where communication between the autonomous driving vehicle and the vehicle control device may be disconnected, before the communication is disconnected. The instruction matching conditions associated with travel control of the autonomous driving vehicle during which the communication is disconnected. Accordingly, it is possible to prevent the travel of the autonomous driving vehicle from being disturbed since the autonomous driving vehicle can determine its operation even though the vehicle sometimes cannot receive the instruction matching the conditions associated with the travel control due to the disconnected communication.

Further, the instruction matching the conditions associated with the travel control of the autonomous driving vehicle (hereinafter simply referred to as a "travel instruction") includes, for example, an instruction to specify a lane (for example, a travel lane, a fast lane, or an uphill lane), an instruction to decelerate by the specified speed, an instruction to specify an upper or lower limit of a vehicle speed, an instruction to maintain the current vehicle speed, an instruction for stopping or emergency stop at an available position, an instruction to keep a predetermined distance from other vehicles in front of the autonomous driving vehicle, and an instruction to allow a user (hereinafter sometimes referred to as an "occupant") to manually drive the vehicle. Moreover, the travel instruction may include instructions to travel in accordance with the latest travel instruction that has already been notified to the autonomous driving vehicle, and instructions to permit the autonomous driving vehicle to carry out complete autonomous travel control. Furthermore, the travel instruction may include information indicating a period during which the travel instruction is valid, such as information indicating a period during which a travel instruction is valid after a vehicle 2 receives the travel instruction (hereinafter referred to as a "valid period"), and information indicating a travel zone in which the travel instruction is valid (hereinafter referred to as a "valid zone"). Additionally, in a case where the valid period or the valid zone of the travel instruction is not indicated, such a travel instruction may be valid until the next travel instruction is received.

Further, the travel instruction may specify one or more driving modes including a plurality of conditions related to travel control. For example, three types of driving modes, that is, a normal mode, a safe mode, and an ultra-safe mode may be prepared. Any one of the three driving modes may be designated as the travel instruction. The normal mode is, for example, a driving mode in which the upper limit of the vehicle speed is set to a legal speed and all lanes are designated as an available lane where the autonomous driving vehicle can travel. The safety mode is a driving mode in which the upper limit of the vehicle speed is set to a speed of (legal speed—20 km/h) and all lanes excluding a fast line are designated as available lanes where the autonomous driving vehicle can travel. Further, the ultra-safety mode is, for example, a driving mode in which the upper limit of the vehicle speed is set to 10 km/h, and a leftmost lane or a road shoulder is designated as the available lane where the autonomous driving vehicle can travel. Moreover, these driving modes may include conditions, in addition to the conditions related to the upper limit of the vehicle speed and the available lane where the autonomous driving vehicle can travel, for example, a condition related to a vehicle-to-vehicle distance. Furthermore, the driving mode may include applying a condition related to the situation around the autonomous driving vehicle or the status of the autonomous driving vehicle itself, based on which of the several conditions associated with the travel control included in the driving mode is applied. For example, the normal mode and the safety mode may further include an instruction to stop the autonomous driving vehicle, in addition to the conditions related to the upper limit of the vehicle speed and the available lane where the autonomous driving vehicle can travel, in a case where a distance to traffic lights closest to the autonomous driving vehicle is equal to or less than a predetermined distance in a travel direction of the autonomous driving vehicle but information indicating whether the traffic light is green, red, or yellow cannot be acquired from a roadside device. Further, the normal mode may further include an instruction to change a lane in which the vehicle travels in a case where the vehicle-to-vehicle distance from the vehicle to a vehicle in front of the autonomous driving vehicle is equal to or less than the predetermined distance.

FIG. 1 is a schematic block diagram of the vehicle control system in which the vehicle control device according to one embodiment is implemented. The vehicle control system 1 includes the vehicle 2 that is an autonomous driving vehicle and a server 3 that is one example of the vehicle control device. In FIG. 1, only one vehicle 2 is illustrated, but the number of the vehicle 2 included in the vehicle control system 2 is not particularly limited, and a plurality of vehicles 2 may be included in the vehicle control system 1. The vehicle 2 and the server 3 can communicate with each other via a communication network 4 (which is configured by, for example, a fiber-optic communication line), and a wireless base station 5 connected to the communication network 4 via a gateway (not shown). In other words, the wireless base station 5 relays communication between the vehicle 2 and the server 3.

The vehicle 2 may be a vehicle used in, for example, a taxi service or a ride-sharing service, or may be a vehicle that is available for a specific user only. Alternatively, the vehicle 2 may be a vehicle for cargo transportation. The vehicle 2 travels autonomously along a travel route to a travel destination, such as a location where a user boarded on the vehicle exits the vehicle and a location where an expected user gets on the vehicle. The travel route may be set in the vehicle 2 by a navigation system of the vehicle 2, or may be transmitted from the server 3 to the vehicle 2 via the communication network 4 and the wireless base station 5. Further, the vehicle 2 travels in accordance with the travel instruction received from the server 3 via the communication network 4 and the wireless base station 5. The vehicle 2 transmits information indicating a communication status between the vehicle 2 and the server 3 to the server 3 via the wireless base station 5 and the communication network 4 at predetermined intervals. The information indicating the communication status between the vehicle 2 and the server 3 includes, for example, a current position of the vehicle 2 detected by a positioning device included in the vehicle 2, and a signal status of a wireless signal received from the wireless base station 5. Alternatively, the vehicle 2 may transmit the information indicating the communication status between the vehicle 2 and the server 3 to the server 3 via the wireless base station 5 and the communication network 4 whenever the vehicle 2 arrives at a specific location, such as a checkpoint on the travel destination and the travel route (for example, an intersection at which a right or left turn is required, or a location at which a distance to the travel destination is the predetermined distance, such as within a range of 100 m to 1 km). Further, in a case where a travel destination is designated by the user boarded on the vehicle 2, the vehicle 2 may transmit the travel destination to the server 3 via the wireless base station 5 and the communication network 4. In a case where a travel route is designated by the navigation system of the vehicle 2, the vehicle 2 may transmit the travel route to the server 3 via the wireless base station 5 or the communication network 4, for example, when the travel route is designated, or when the vehicle 2 starts to travel in accordance with the designated travel route.

The server 3 tracks the vehicle 2 based on a position of the vehicle 2 received from the vehicle 2. The server 3 creates a travel instruction for the vehicle 2 at a predetermined time, for example, in accordance with an operation input by an operator, or in accordance with a situation on the travel route of the vehicle 2, and transmits the created travel instruction to the vehicle 2 via the communication network 4 and the wireless base station 5.

The predetermined time may be, for example, a time at which the vehicle 2 starts to travel along the designated travel route, a time at which the vehicle 2 enters into or leaves from a specific road (for example, a freeway or a limited highway) or a specific facility (for example, a parking lot), or a time at which the vehicle 2 arrives at a location at the predetermined distance to the checkpoint on the travel route.

Furthermore, in a case where the communication between the server 3 and the vehicle 2 may be disconnected, the server 3 creates the travel instruction for the vehicle 2 that can be applied during a period when the communication is disconnected, and transmits the created instruction to the vehicle 2 via the communication network 4 and the wireless base station 5, before the communication is disconnected.

Further, the server 3 may be communicable with another server (not shown) for notifying traffic information indicating a traffic situation via the communication network 4. The server 3 may acquire the travel route of the vehicle 2 and the traffic information around the travel route from another server for notifying the traffic information via the communication network 4.

Further, the vehicle control system 1 may further include one or more portable terminals (not shown) communicable with the server 3 via the wireless base station 5 and the communication network 4. Such a portable terminal can be, for example, a mobile phone owned by a user using the vehicle 2. The portable terminal transmits a ride request including, for example, identification information of the user, a location at which the user is expected to get on the vehicle (hereinafter referred to as a "boarding location"), and a location at which the user is expected to exit the vehicle (hereinafter referred to as a "exiting location"), to the server 3 via the wireless base station 5 and the communication network 4, as operated by the user. In such a case, the server 3 may notify the vehicle 2 via the communication network 4 and the wireless base station 5 of a dispatch instruction, including the getting-on location and the getting-off location, which have been included in the ride request, and may permit the vehicle 2 to direct to the getting-on location, pick up the user, and then travel to the getting-off location.

Figure 2:
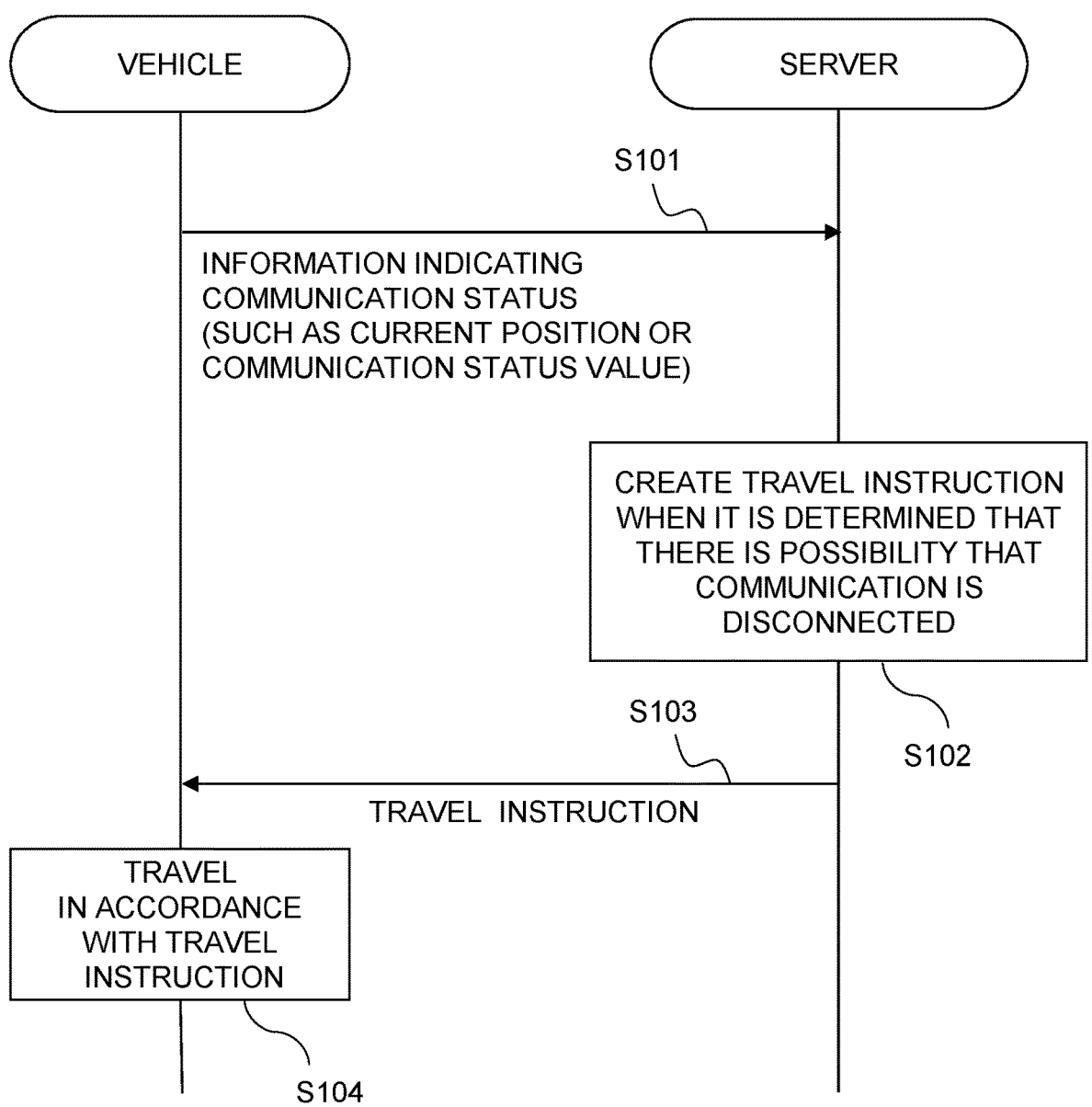
FIG. 2 is a sequence diagram of vehicle control processing.

FIG. 2 is a sequence diagram of vehicle control processing. In the sequence diagram illustrated in FIG. 2, the communication between the vehicle 2 and the server 3 is carried out via the communication network 4 and the wireless base station 5, as stated above.

The vehicle 2 transmits the information indicating the communication status to the server 3 (step S101). The server 3 determines whether the communication between the vehicle 2 and the server 3 may be disconnected or not based on the information indicating the communication status received from the vehicle 2, and creates the travel instruction in a case where it is determined that the communication may be disconnected (step S102). The server 3 transmits the created travel instruction to the vehicle 2 (step S103). The vehicle 2 travels in accordance with the received travel instruction (step S104).

Figure 3:
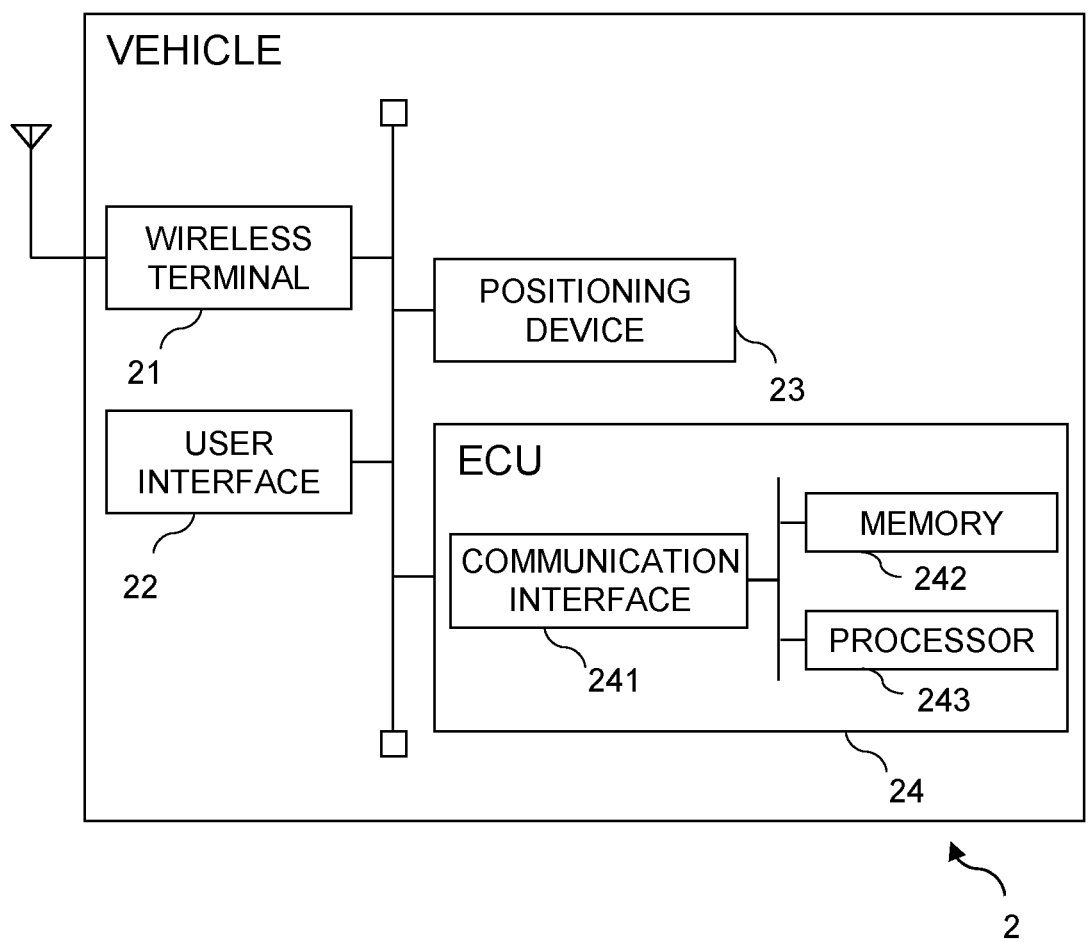
FIG. 3 is a schematic block diagram of a control system associated with travel control of a vehicle involved in the vehicle control system.

FIG. 3 is a schematic block diagram of a control system related to travel control of the vehicle 2. The vehicle 2 includes a wireless terminal 21, a user interface 22, a positioning device 23, and an electronic control unit (ECU) 24. The wireless terminal 21, the user interface 22, and the positioning device 23 are communicably connected to the ECU 24 via, for example, an in-vehicle network, provided in the vehicle 2 and conforming to a standard, such as a controller area network (CAN). The vehicle 2 may further include an outside-camera (not shown) that captures images of surrounding areas of the vehicle 2 and generates an out-of-vehicle image showing the surrounding areas, an outside sensor (not shown), such as a radar and a LIDAR sensor, for acquiring information around the vehicle 2, a storage device (not shown) for storing map information, and a navigation system for acquiring the travel route from the current position of the vehicle 2 to the travel destination in accordance with a predetermined route search algorithm, such as Dijkstra's algorithm.

The wireless terminal 21 is one example of the communication unit, which includes, for example, an antenna and a signal processing circuit that executes various processes related to the wireless communication, such as modulation and demodulation of a wireless signal. The wireless terminal 21 receives a downlink wireless signal from the wireless base station 5 and transmits an uplink wireless signal to the wireless base station 5. In other words, the wireless terminal 21 extracts a signal (for example, the travel instruction) transmitted from the server 3 to the vehicle 2, from the downlink wireless signal received from the wireless base station 5, and passes the signal to the ECU 24. Further, the wireless terminal 21 generates the uplink wireless signal including a signal (for example, the current position of the vehicle 2 and the travel route), received from the ECU 24 to be transmitted to the server 3, and transmits such a wireless signal. The wireless terminal 21 may output to the ECU 24 a value indicating a status of the wireless signal received by the wireless terminal 21 (hereinafter simply referred to as a "signal status value") at the predetermined intervals. The signal status value may be, for example, a signal indicating strength of the wireless signal received by the wireless terminal 21 from the wireless base station 5, such as a received signal strength indicator (RSSI) and a reference signal received power (RSRP), or a signal indicating quality of the wireless signal received by the wireless terminal 21 from the wireless base station 5, such as signal-to-interference plus noise ratio (SINR) and a bit error rate. In such a case, the stronger the strength of the wireless signal or the better the quality of the wireless signal, the better the communication status between the wireless terminal 21 and the wireless base station 5 indicated by the signal status value.

The user interface 22 is one example of the user interface unit, which displays various information (for example, a map around the current position of the vehicle 2, the travel route, a distance to the getting-off location, and a scheduled arrival time at the getting-off location) to the user boarded on the vehicle 2. Further, the user interface 22 generates an operation signal corresponding to an operation performed by the user boarded on the vehicle 2, and outputs the operation signal to the ECU 24. Consequently, the user interface 22 is installed in a passenger compartment of the vehicle 2 and includes, for example, a display device, such as a liquid crystal display and an input device having one or more operation buttons. Alternatively, the user interface 22 may be a device in which the display device and the input device are integrated, such as a touchscreen display.

The positioning device 23 is one example of a positioning unit, which measures the position of the vehicle 2 at the predetermined intervals. Consequently, the positioning device 23 may include, for example, a receiver that receives a global positioning system (GPS) signal and an arithmetic circuit that calculates the position of the vehicle 2 from the GPS signal. The positioning device 23 may be incorporated in the navigation system. The positioning device 23 outputs the measured value to the ECU 24 every time the position of the vehicle 2 is measured.

The ECU 24 is one example of the travel control unit, which controls automatic driving of the vehicle 2 and controls each unit of the vehicle 2. Consequently, the ECU 24 includes, for example, a communication interface 241 for communicating with each unit of the vehicle 2, a memory 242, and a processor 243.

The communication interface 241 has an interface circuit for connecting the ECU 24 to the in-vehicle network. In other words, the communication interface 241 is connected to the wireless terminal 21, the user interface 22, and the positioning device 23 via the in-vehicle network. The communication interface 241 passes a signal from the wireless terminal 21 to the processor 243, which has been received from the server 3, such as the dispatch instruction and the travel instruction. Similarly, the communication interface 241 passes to the processor 243 the operation signal received from the user interface 22, the measured value of the current position of the vehicle 2 received from the positioning device 23, or the out-of-vehicle image received from the outside-camera. The communication interface 241 outputs a signal received from the processor 243 to the wireless terminal 21, which is the signal to be transmitted to the server 3, such as the current position of the vehicle 2.

Further, the communication interface 241 outputs a signal received from the processor 243 to the user interface 22, which includes the information to be displayed on the user interface 22.

The memory 242 is one example of the storage unit, which includes, for example, a volatile semiconductor memory and a nonvolatile semiconductor memory. The memory 242 stores data used in various processes executed by the processor 243 of the ECU 24, for example, the current position of the vehicle 2, the travel route, the getting-on location and getting-off location of the user, included in the dispatch instruction, and the travel instruction. Further, the memory 242 may store the out-of-vehicle image or the map information.

The processor 243 includes one or more central processing units (CPUs) and peripheral circuits of the CPUs. The processor 243 may further include another arithmetic circuit, such as a logical operation unit, a numerical operation unit, and a graphic processing unit. In a case where the vehicle 2 receives the dispatch instruction, the processor 243 notifies the navigation system of the current position of the vehicle 2 and the getting-on location included in the dispatch instruction, and permits the navigation system to search the travel route from the current position of the vehicle 2 to the getting-on location. In a case where the user gets on the vehicle 2, the processor 243 notifies the navigation system of the position of the vehicle 2 when the user gets on the vehicle 2, measured by the positioning device 23, and the getting-off location included in the dispatch instruction, and permits the navigation system to search the travel route from the position of the vehicle when the user gets on the vehicle 2 to the getting-on location. As stated above, the processor 243 may receive the travel route from the server 3 via the communication network 4 or the like.

The processor 243 controls the automatic driving of the vehicle 2 so that the vehicle 2 travels along the searched travel route. The processor 243 controls the automatic driving of the vehicle 2 in accordance with the travel instruction in the valid period or the valid zone designated by the travel instruction received from the server 3. For example, if the travel instruction is an instruction designating that the vehicle travels in a specific lane, the processor 243 performs lane detection processing on the out-of-vehicle image and detects the designated lane shown in the out-of-vehicle image, and controls a steering wheel of the vehicle 2 so that the vehicle 2 travels in the designated lane. Further, if the travel instruction designates the upper limit of the vehicle speed, the processor 243 controls a powertrain and a brake mechanism of the vehicle 2 so that the vehicle speed of the vehicle 2 is maintained below the upper limit value. Further, if the travel instruction is to stop the vehicle, the processor 243 controls the steering wheel, the powertrain, and the brake mechanism of the vehicle 2 so that the vehicle 2 is stopped at a road shoulder or at a parking lot within a predetermined range from the current position. Furthermore, if the travel instruction is to permit manual driving by the user boarded on the vehicle 2, the processor 243 controls the travel of the vehicle 2 in accordance with the steering wheel, an accelerator, a brake pedal or the like, as operated by the user. If the valid period of the travel instruction is designated, the processor 243 can determine that the travel instruction is valid if a time elapsed from a receiving time of the travel instruction is within the designated valid period. Similarly, in a case where the valid zone of the travel instruction is designated, the processor 243 can determine that the travel instruction is valid if a travel distance from a position of the vehicle 2 when the travel instruction is received to the current position of the vehicle 2 is within the designated valid zone.

Further, the processor 243 transmits to the server 3 via the wireless terminal 21 the identification information of the vehicle 2, together with at least any of the measured value of the current position of the vehicle 2 acquired by the positioning device 23, the out-of-vehicle image, and the signal status value, at the predetermined intervals (for example, 30 seconds, 1 minute, or 5 minutes). Further, the processor 243 may transmit the travel route obtained by the navigation system to the server 3 via the wireless terminal 21 together with the identification information of the vehicle 2.

Figure 4:
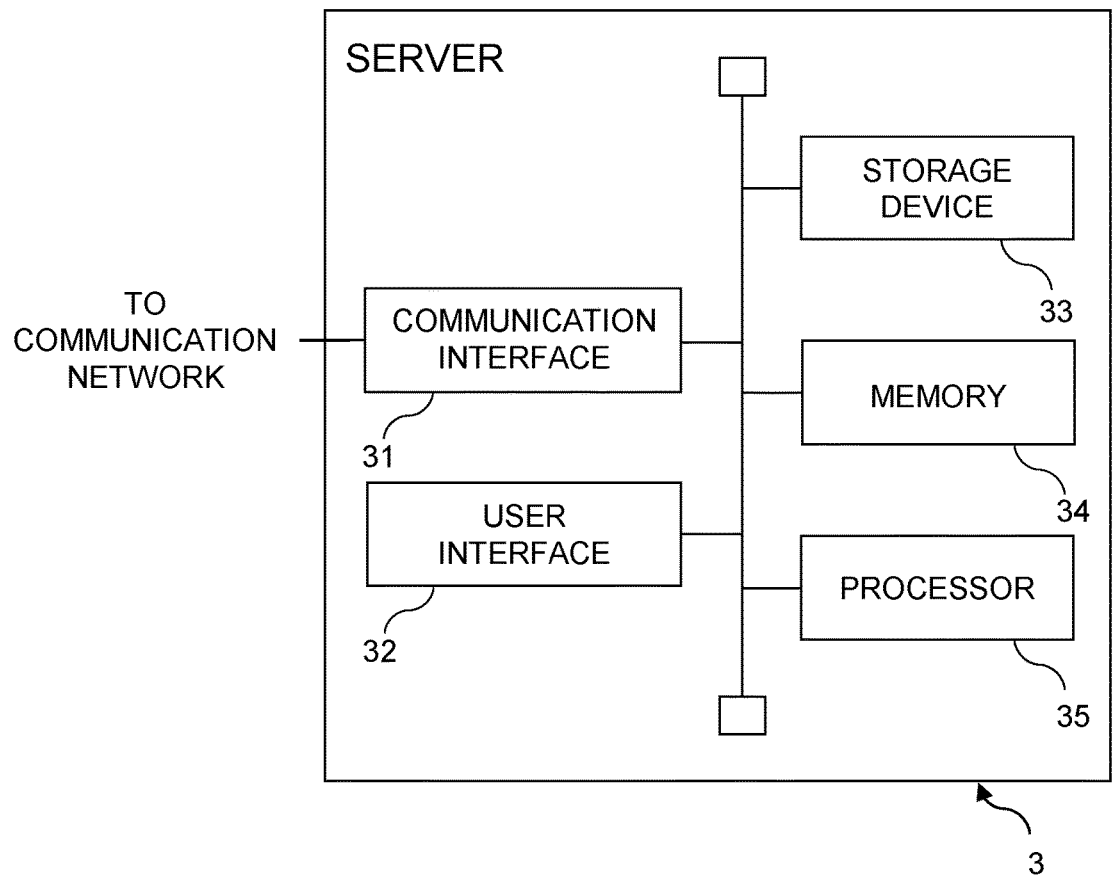
FIG. 4 is a schematic block diagram of a server which is one example of the vehicle control device.

FIG. 4 is a schematic block diagram of the server 3, which is one example of the vehicle control device. The server 3 includes a communication interface 31, a user interface 32, a storage device 33, a memory 34, and a processor 35. The communication interface 31, the user interface 32, the storage device 33, and the memory 34 are connected to the processor 35 via signal lines.

The communication interface 31 is one example of the communication unit, which has an interface circuit for connecting the server 3 to the communication network 4. The communication interface 31 is configured to be communicable with the wireless terminal 21 of the vehicle 2 via the communication network 4 and the wireless base station 5. In other words, the communication interface 31 passes, to the processor 35, the signal indicating the current position of the vehicle 2 received from the wireless terminal 21 of the vehicle 2 via the wireless base station 5 and the communication network 4. Further, the communication interface 31 transmits the dispatch instruction or the travel instruction for the vehicle 2, received from the processor 35, to the vehicle 2 via the communication network 4 and the wireless base station 5.

The user interface 32 includes, for example, an input device, such as a keyboard and a mouse, and a display device, such as a liquid crystal display. Alternatively, the user interface 32 may have a device in which the display device and the input device are integrated, such as a touch-screen display. For example, the user interface 32 displays the current position of the vehicle 2 received from the processor 35 together with the map around the current position. Further, the user interface 32 may display information indicating the out-of-vehicle image of the vehicle 2 received from the processor 35, the information on the travel control of the vehicle 2 (for example, details of the travel instruction which has been transmitted to the vehicle 2), the travel route of the vehicle 2, or the traffic situation of a road around the travel route of the vehicle 2 (for example, whether traffic congestion occurs, a length of a traffic stream, whether a traffic accident has occurred, whether there is a falling object or a disabled vehicle, and lane restrictions due to construction). Further, the user interface 32 may display candidates for the travel instructions applicable to the vehicle 2.

In addition, the user interface 32 generates an operation signal (for example, a signal indicating the travel instruction applied to the vehicle 2) in accordance with the input device as operated by the operator, and passes the operation signal to the processor 35.

The storage device 33 is one example of the storage unit, which has, for example, a hard disk device or an optical recording medium, as well as an access device for the media. The storage device 33 stores the identification information of the vehicle 2, the information indicating the communication status between the vehicle 2 and the server 3 (for example, the current position of the vehicle 2 and the signal status value), and the travel route of the vehicle 2. The storage device 33 stores the map information. The map information may include information indicating an area where the communication between the vehicle 2 and the server 3 may be disconnected (hereinafter referred to as a "communication disconnection area"). Furthermore, the storage device 33 may store a computer program for executing the vehicle control processing.

The memory 34 is one example of the storage unit, which includes, for example, a nonvolatile semiconductor memory and a volatile semiconductor memory. The memory 34 stores various data generated during execution of the vehicle control processing.

The processor 35 is one example of the control unit, which includes one or more central processing units (CPUs) and peripheral circuits of the CPUs. The processor 35 may further include another arithmetic circuit, such as a logical operation unit and a numerical operation unit. The processor 35 executes the vehicle control processing.

Figure 5:
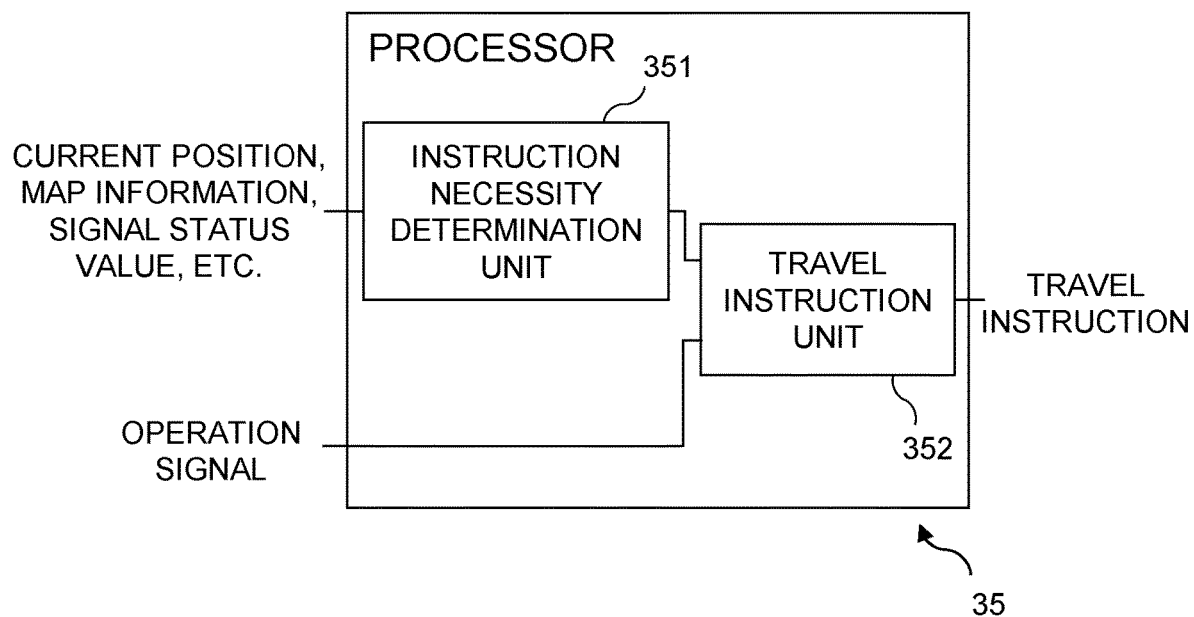
FIG. 5 is a function block diagram of a processor of the server associated with the vehicle control processing.

FIG. 5 is a function block diagram of the processor 35 related to the vehicle control processing. The processor 35 includes an instruction necessity determination unit 351 and a travel instruction unit 352. Each of these units included in the processor 35 is, for example, a functional module implemented by a computer program on the processor 35. Alternatively, these units included in the processor 35 may be dedicated arithmetic circuits provided in the processor 35.

The instruction necessity determination unit 351 is one example of the determination unit, which determines whether the travel instruction should be transmitted to the vehicle 2 or not. In the present embodiment, the instruction necessity determination unit 351 determines whether the communication between the vehicle 2 and the server 3 may be disconnected or not, and determines that the travel instruction should be transmitted to the vehicle 2 in a case where it is determined that the communication may be disconnected.

For example, the instruction necessity determination unit 351 determines that the travel instruction should be transmitted to the vehicle 2 in a case where the signal status value received from the vehicle 2 satisfies a communication disconnection condition indicating that the communication between the vehicle 2 and the server 3 may be disconnected. The communication disconnection condition is, for example, in a case where the signal status value is a value, such as RSSI, RSRP, and SINR, indicating that a signal status is better as the signal status value is higher, that the latest signal status value is lower than a predetermined threshold value. In such a case, the predetermined threshold value is set to, for example, a lower limit of the signal status value at which the communication between the vehicle 2 and the server 3 can be maintained, or a value obtained by adding a predetermined margin to the lower limit. The communication disconnection condition is that, for example, in a case where the signal status value is a value, such as a bit error rate, indicating that the signal status is better as the signal status value is lower, the latest signal status value is equal to or higher than a predetermined threshold value. In such a case, the predetermined threshold value is set to, for example, an upper limit of the signal status value at which the communication between the vehicle 2 and the server 3 can be maintained, or a value obtained by subtracting a predetermined margin from the upper limit. Further, the instruction necessity determination unit 351 may predict a future change in the signal status value by employing a prediction filter, such as a linear prediction filter and a Kalman filter, based on a plurality of signal status values most recently received. The instruction necessity determination unit 351 may determine that the travel instruction should be transmitted to the vehicle 2 in a case where a predicted value of the signal status value satisfies the communication disconnection condition from a present time to a predetermined time (for example, 3 minutes, 5 minutes, or 10 minutes) ahead.

Alternatively, the instruction necessity determination unit 351 may determine that the travel instruction should be transmitted to the vehicle 2 referring to the current position of the vehicle 2 and the map information, in a case where the current position of the vehicle 2 is the communication disconnection area indicated by the map information, since the communication between the vehicle 2 and the server 3 may be disconnected. Further, the instruction necessity determination unit 351 may determine that the travel instruction should be transmitted to the vehicle 2 referring to the current position of the vehicle 2 and the map information, as well as the travel route of the vehicle 2, in a case where at least a part of the travel route of the vehicle 2 is included in the communication disconnection area within a predetermined range from the current position of the vehicle 2 (for example, a range with a radius of 1 km to 3 km centered on the current position), since the communication between the vehicle 2 and the server 3 may be disconnected.

Consequently, in a case where the communication between the vehicle 2 and the server 3 may be disconnected, the instruction necessity determination unit 351 is able to permit the server 3 to transmit the travel instruction to the vehicle 2 before the communication is disconnected.

When the instruction necessity determination unit 351 determines that the travel instruction should be transmitted to the vehicle 2, the instruction necessity determination unit 351 notifies the travel instruction unit 352 of the determination result.

When the travel instruction unit 352 receives from the instruction necessity determination unit 351 the determination result that the travel instruction should be transmitted to the vehicle 2, the travel instruction unit 352 creates the travel instruction.

For example, when the travel instruction unit 352 receives the determination result that the travel instruction should be transmitted to the vehicle 2, the travel instruction unit 352 displays on the user interface 32 a message prompting the user to give the travel instruction to the vehicle 2. The operator may determine the travel instruction to be applied to the vehicle 2 for a certain period immediately thereafter, referring to the current position of the vehicle 2, the travel route, the map information, the traffic situation, and the like, and may perform the operation corresponding to the travel instruction on the user interface 32. Furthermore, the operator may designate the valid period or the valid zone of the travel instruction. At this time, the valid period or the valid zone may be designated so that the travel instruction remains valid during the period in which communication between the vehicle 2 and the server 3 is disconnected. For example, in a case where it can determined from the map information by the operator that the disconnected communication between the vehicle 2 and the server 3 is due to the travel route of the vehicle 2, the operator can designate the valid period (or the valid zone) of the travel instruction until the cause of the disconnected communication is eliminated. For example, in a case where the vehicle 2 passes through a tunnel, the operator can designate a zone as the valid zone until the vehicle 2 passes through the tunnel. The travel instruction unit 352 can create the travel instruction corresponding to the operation signal received from the user interface 32.

Alternatively, the storage device 33 is provided with a reference table indicating a correlation between the travel instruction with at least one of road information indicating a type and a structure of a road (for example, a local road, a highway, number of lanes, and inside of a tunnel) and traffic situation (for example, lane restrictions and whether traffic congestion occurs or not). In such a case, the travel instruction unit 352 may specify the travel instruction corresponding to the road information and the traffic situation on the travel route of the vehicle 2 within the predetermined range from the current position of the vehicle 2 referring to the reference table. The travel instruction unit 352 may create the travel instruction as specified. For example, the travel instruction unit 352 can acquire, for example, the road information on the travel route of the vehicle 2 within the predetermined range from the current position of the vehicle 2 referring to the map information. In addition, the travel instruction unit 352 can acquire, for example, information indicating the traffic situation around the travel route of the vehicle 2 within the predetermined range from the current position of the vehicle 2, from another server (not shown) for notifying the traffic information and which is communicably connected to the server 3 via the communication network 4. For example, in a case where the instruction to travel in a travel lane is associated with a road in the tunnel, and in a case where a road on the travel route of the vehicle 2 within the predetermined range from the current position of the vehicle 2 is the road in the tunnel, the travel instruction unit 352 can create the instruction to travel in the travel lane as the travel instruction. Alternatively, the travel instruction unit 352 may specify the travel instruction corresponding to the road information and the traffic situation on the travel route of the vehicle 2 within the predetermined range from the current position of the vehicle 2 referring to the reference table, and may display on the user interface 32 the specified travel instruction as a candidate for the travel instruction to be applied to the vehicle 2.

The travel instruction unit 352 transmits the created travel instruction to the vehicle 2 via the communication interface 31, the communication network 4, and the wireless base station 5.

Figure 6:
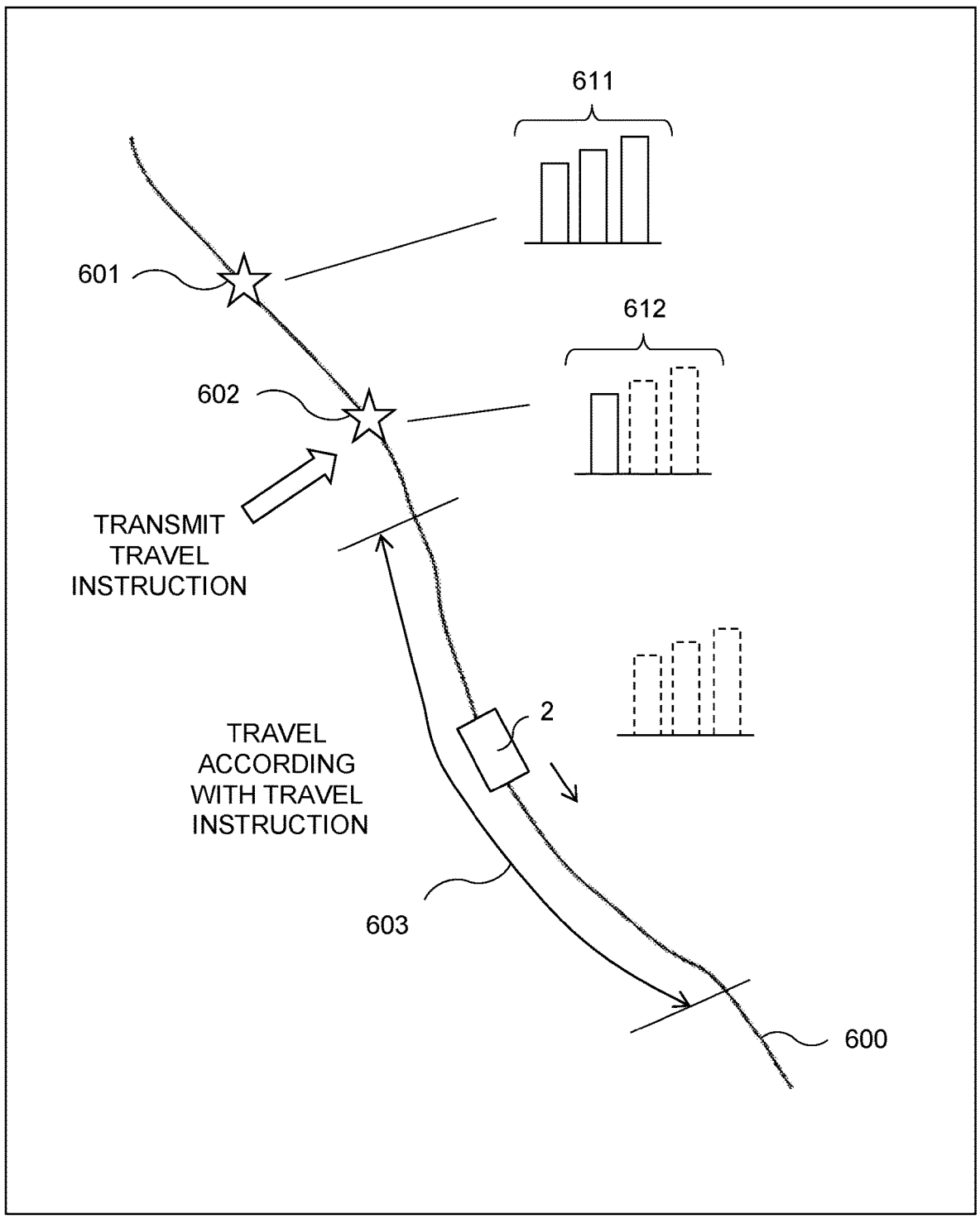
FIG. 6 is a diagram illustrating one example of a transmission time of a travel instruction.

FIG. 6 is a diagram illustrating one example of a transmission time of the travel instruction. The vehicle 2 travels along a travel route 600. It is assumed that the communication status between the vehicle 2 and the server 3 is good at a point 601 on the travel route 600, and a signal status value 611 does not satisfy a communication disconnection status. In such a case, the travel instruction for the vehicle 2 may not be transmitted at the point 601. Meanwhile, it is assumed that the communication status between the vehicle 2 and the server 3 is deteriorated at a point 602 on the travel route 600, and a signal status value 612 satisfies that communication disconnection status. In such a case, the communication between the vehicle 2 and the server 3 may be disconnected as the vehicle 2 moves forward from the point 602. The travel instruction is transmitted from the server 3 to the vehicle 2. Therefore, even when the communication between the vehicle 2 and the server 3 is disconnected in a zone 603 after the point 602 on the travel route 600, the ECU 24 receives the travel instruction before entering the zone 603, and thus the vehicle 2 can travel in accordance with the travel instruction while running in the zone 603.

FIG. 7 is an operational flowchart of the vehicle control processing. The processor 35 of the server 3 executes the vehicle control processing, for example, in accordance with the operation flowchart shown below for every predetermined period.

The instruction necessity determination unit 351 of the processor 35 acquires, from the vehicle 2 via the wireless base station 5 and the communication network 4, the information indicating the communication status between the vehicle 2 and the server 3, such as the current position of the vehicle 2 and the signal status value (step S201). The instruction necessity determination unit 351 determines whether the communication between the vehicle 2 and the server 3 may be disconnected or not based on the information indicating the communication status between the vehicle 2 and the server 3 (step S202). If the communication between the vehicle 2 and the server 3 is not likely to be disconnected (NO in step S202), the processor 35 ends the vehicle control processing.

On the other hand, in a case where the communication between the vehicle 2 and the server 3 may be disconnected (YES in step S202), the travel instruction unit 352 of the processor 35 creates the travel instruction for the vehicle 2, and transmits the created travel instruction to the vehicle 2 via the communication interface 31, the communication network 4, and the wireless base station 5 (step S203). The processor 35 ends the vehicle control processing.

As stated above, the vehicle control device acquires the information indicating the communication status between the autonomous driving vehicle and the vehicle control device, and determines whether the communication between the autonomous driving vehicle and the vehicle control device may be disconnected or not based on the information. The vehicle control device transmits travel instructions to the autonomous driving vehicle in a case where the communication between the autonomous driving vehicle and the vehicle control device may be disconnected, before the communication between the autonomous driving vehicle and the vehicle control device is actually disconnected. Accordingly, it is possible to prevent the travel of the autonomous driving vehicle from being disturbed since the autonomous driving vehicle can determine its operation even though the vehicle sometimes cannot receive the travel instruction due to the disconnected communication.

According to a modified example, the occupant of the vehicle 2 may check the received travel instruction and determine whether or not to approve the travel instruction. In such a case, the ECU 24 of the vehicle 2 may display on the user interface 22 of the vehicle 2 the travel instruction received via the wireless terminal 21. The occupant performs an operation indicating whether or not to approve the received travel instruction via the user interface 22. In a case where the operation for approving the received travel instruction is performed via the user interface 22, the ECU 24 can control the travel of the vehicle 2 in accordance with the travel instruction. Meanwhile, in a case where the operation for denying the received travel instruction is performed via the user interface 22, the ECU 24 can autonomously control the travel of the vehicle 2 without following the received travel instruction.

According to another modified example, when the travel instruction unit 352 of the processor 35 of the server 3 receives the determination result that the travel instruction should be transmitted to the vehicle 2, the travel instruction unit 352 may create several travel instructions as operated by the operator via the user interface 32, and may transmit several travel instructions to the vehicle 2 via the communication interface 31, the communication network 4, and the wireless base station 5. Meanwhile, the ECU 24 of the vehicle 2 may display on the user interface 22 of the vehicle 2 each of the travel instructions received via the wireless terminal 21. The ECU 24 may control the travel of the vehicle 2 in accordance with the travel instruction selected by the occupant of the vehicle 2 via the user interface 22.

In such a case, a priority may be given to each of the travel instructions. The priority may be given by the operator via the user interface 32 of the server 3, or the travel instruction unit 352 may assign the priority in accordance with details of each of the travel instructions. In such a case, the storage device 33 may store in advance, for example, a reference table indicating the correlation between each of the possible travel instructions and the priority. The travel instruction unit 352 may assign the priority to each of the specified travel instructions, as operated by the operator, referring to the reference table. In such a case, the priority for each travel instruction may be designated so that the higher the safety of the vehicle 2, the higher the priority.

The ECU 24 of the vehicle 2 may display on the user interface 22 of the vehicle 2 each of the received travel instructions together with the priority. Alternatively, the ECU 24 may control the travel of the vehicle 2 in accordance with any one of the received travel instructions. Here, the ECU 24 may select applicable travel instructions in accordance with the situation around the vehicle 2 out of the received travel instructions, and may select the travel instruction with the highest priority out of the selected travel instructions, as the travel instruction to be applied. For example, it is assumed that the received travel instructions respectively are an instruction to drive in the travel lane, an instruction to designate the upper limit of the vehicle speed, and an instruction to designate a vehicle-to-vehicle distance from the vehicle to a vehicle in front of the autonomous driving vehicle. Further, among these travel instructions, it is assumed that the priority of the instruction to drive in the travel lane is the highest, while the priority of the instruction to designate the upper limit of the vehicle speed is the lowest. In such a case, when the ECU 24 detects an obstacle on the travel lane based on the information acquired by the outside sensor, the vehicle 2 can no longer travel in the travel lane, and thus the ECU 24 selects the instruction to designate the upper limit of the vehicle speed, and the instruction to designate a vehicle-to-vehicle distance from the vehicle to a vehicle in front of the autonomous driving vehicle. Since the priority of the instruction to designate a vehicle-to-vehicle distance from the vehicle to a vehicle in front of the autonomous driving vehicle is higher than the priority of the instruction to designate the upper limit of the vehicle speed, the ECU 24 can control the travel of the vehicle 2 in accordance with the instruction to designate a vehicle-to-vehicle distance from the vehicle to a vehicle in front of the autonomous driving vehicle.

According to still another modified example, the instruction necessity determination unit 351 of the processor 35 of the server 3 may determine whether the travel instruction should be transmitted to the vehicle 2 or not, based on information other than the communication status between the vehicle 2 and the server 3. For example, the instruction necessity determination unit 351 may determine whether a predetermined traffic situation is encountered or not when the vehicle 2 continuously travels along the travel route, and may determine that the travel instruction should be transmitted to the vehicle 2 in a case where it is determined that the predetermined traffic situation is encountered. The predetermined traffic situation includes, for example, a situation in which traffic congestion has occurred, an accident has occurred, a lane restriction is in place, or an obstacle, such as a falling object and a disabled vehicle exists. In such a case, the instruction necessity determination unit 351 can determine whether the predetermined traffic situation occurs on the travel route within the predetermined range from the current position of the vehicle 2, for example, referring to the information on the traffic situation, which is received by the server 3 from another server for notifying the traffic situation via the communication network 4. The instruction necessity determination unit 351 can determine that the travel instruction for the vehicle 2 should be transmitted in a case where the predetermined traffic situation occurs on the travel route within the predetermined range from the current position of the vehicle 2.

In such a case, the travel instruction unit 352 may display on the user interface 32 of the server 3, the information indicating the traffic situation occurring on the travel route within the predetermined range from the current position of the vehicle 2, so that the operator can select the appropriate travel instruction. According to this modified example, before the autonomous driving vehicle encounters the predetermined traffic situation, the vehicle control device can transmit the appropriate travel instruction in accordance with the traffic situation to the autonomous driving vehicle. Therefore, even when the autonomous driving vehicle encounters the predetermined traffic situation, the autonomous driving vehicle can travel more safely.

A computer program for causing a computer to execute the vehicle control processing executed by the processor 35 of the server 3 may be recorded and distributed on a recording medium, such as an optical recording medium and a magnetic recording medium.

As described above, various modifications may be made by those skilled in the art based on the embodiment to be implemented, within the scope of the present disclosure.

What is claimed is:

1. A vehicle control system comprising:
    an autonomous driving vehicle that autonomously travels; and
    a vehicle control device, wherein the vehicle control device includes:
    a communication interface configured to be communicable with the autonomous driving vehicle; and
    a processor configured to:
    determine whether there is a possibility that communication between the autonomous driving vehicle and the vehicle control device is disconnected or not, based on information indicating a communication status between the autonomous driving vehicle and the vehicle control device; and
    set, when there is the possibility that the communication between the autonomous driving vehicle and the vehicle control device is disconnected, a priority for each of a plurality of travel instructions, the plurality of travel instructions matching conditions associated with travel control of the autonomous driving vehicle, and transmit each of the plurality of travel instructions to the autonomous driving vehicle via the communication interface together with the priority set for the travel instruction, before the communication between the autonomous driving vehicle and the vehicle control device is disconnected, and
    wherein the autonomous driving vehicle includes a travel control unit configured to select travel instructions that are applicable depending on a situation around the autonomous driving vehicle out of the plurality of the received travel instructions, and control the autonomous driving vehicle such that the autonomous driving vehicle travels according to a travel instruction with the highest priority out of the selected travel instructions.

2. The vehicle control system according to claim 1, wherein:
the autonomous driving vehicle further includes a user interface configured to notify a user who boards the autonomous driving vehicle of the plurality of received travel instructions; and
the travel control unit of the autonomous driving vehicle is configured to control the autonomous driving vehicle such that the autonomous driving vehicle travels according to a travel instruction selected by the user via the user interface out of the plurality of received travel instructions.

3. A vehicle control method using a vehicle control device configured to control an autonomous driving vehicle that autonomously travels and to be communicably connected to the autonomous driving vehicle, the method comprising:
determining, by the vehicle control device, whether there is a possibility that communication between the autonomous driving vehicle and the vehicle control device is disconnected, based on information indicating a communication status between the autonomous driving vehicle and the vehicle control device;
setting, by the vehicle control device, when there is the possibility that the communication between the autonomous driving vehicle and the vehicle control device is disconnected, a priority for each of a plurality of travel instructions, the plurality of travel instructions matching conditions associated with travel control of the autonomous driving vehicle, and transmitting each of the plurality of travel instructions to the autonomous driving vehicle via a communication interface together with the priority set for the travel instruction, before the communication between the autonomous driving vehicle and the vehicle control device is disconnected; and
selecting, by the autonomous driving vehicle, travel instructions that are applicable depending on a situation around the autonomous driving vehicle out of the plurality of the received travel instructions, and controlling the autonomous driving vehicle such that the autonomous driving vehicle travels according to a travel instruction with the highest priority out of the selected travel instructions.

* * * * *